UNITED STATES PATENT OFFICE.

JOSEPH H. GIBSON, OF LISLE, AND JOSEPH G. FISH, OF BINGHAMTON, N. Y.

INSECTICIDE COMPOUND.

SPECIFICATION forming part of Letters Patent No. 286,195, dated October 9, 1883.

Application filed April 20, 1883. (Specimens.)

*To all whom it may concern:*

Be it known that we, JOSEPH H. GIBSON, a resident of the town of Lisle, county of Broome, and State of New York, and JOSEPH G. FISH, a resident of the city of Binghamton, of the county and State aforesaid, citizens of the United States, have invented a certain new and useful Improvement in Insect-Destroying Compounds, particularly for the Colorado potato-bug; and we do hereby declare that the following is a full, clear, and exact description of the invention, which will enable others skilled in the art to which it appertains to make and use the same.

Hitherto the Colorado potato-bug has been destroyed by the use of paris-green, London purple, and other arsenical compounds, which, if not destroying the potatoes entirely, have so shocked and weakened the plants as to reduce their yield from ten to twenty-five per cent. in quantity, and to such extent in quality as to render them in many instances neither palatable nor wholesome.

To carry out our invention we take equal quantities of the wood of the *Picræna quassia* or *Picræna excelsa*, the bark of the lemon-walnut, (*Juglans cinerea*,) and the herb of the thorn apple, (*Datura stramonium*,) and an amount of the root of the wild lemon (*Podophyllum peltatum*) equal to the combined weight of the first three mentioned, and, in a perfectly dry state, thoroughly mix and pulverize the whole together, when it is fit for use. In its use for the destruction of house-vermin, we put it in a dry state on articles of furniture infested by them, or, if cockroaches, put it plentifully in a dry state in the paths they frequent. For the potato-bug, cabbage-worm, current-worm &c., we take a quantity of water, which, when sprinkled on the foliage infested, will make it a little more moist than would a good heavy dew, and add to it a pound of the powder to each five to six gallons of water, and let it stand, with frequent agitating, twelve to twenty-four hours. Now, select the hours of the day in which the vermin, of whatever character, is feeding and visible and exposed, and apply with a sprinkler this solution—sediment and all—evenly to the foliage, as indicated above. This will destroy all insect life upon the plant, particularly the Colorado potato-bug, while the plant will be left with a deeper and healthier green, stimulated to a more vigorous growth and greater productiveness, and will not be found poisonous to handle by man or to be eaten by animals.

We are aware that the above articles have been used as medicines, but are not aware that all the ingredients of our composition, in the proportions stated, have been used together for the above or for any other purpose.

What we claim as our invention, and wish to secure by Letters Patent of the United States, is—

The herein-described composition of matter for the destruction of insect life, particularly the Colorado potato-bug and cotton-worm, consisting of the wild lemon, (*Podophyllum peltatum*,) *Picræna* or *Quassia*, the lemon-walnut, (*Juglans cinerea*,) and thorn apple. (*Datura stramonium*,) in the proportions specified.

JOSEPH H. GIBSON.
JOS. G. FISH.

Witnesses:
FAYETTE SEEBER,
J. C. BAILEY.